Nov. 7, 1944.  J. H. PETERSON  2,362,303
BRAKE MECHANISM
Filed March 29, 1943
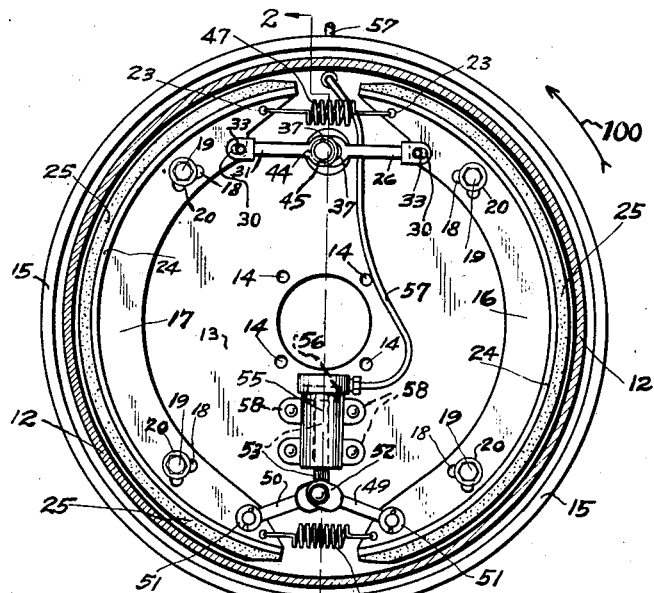
Fig.1.
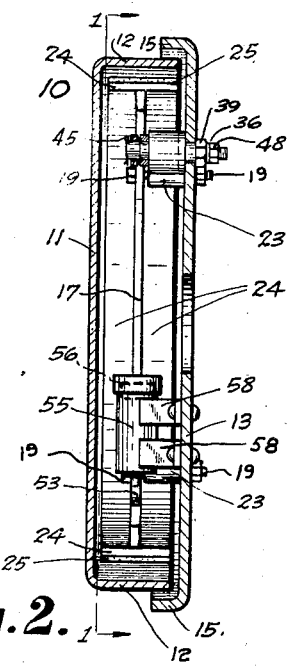
Fig.2.
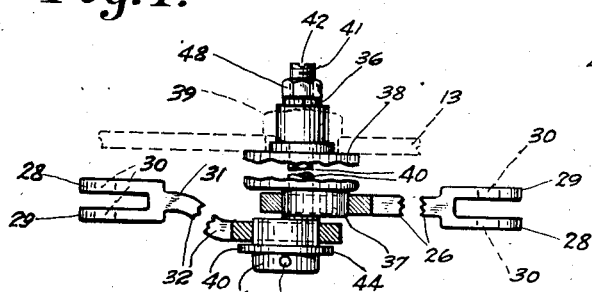
Fig.3.
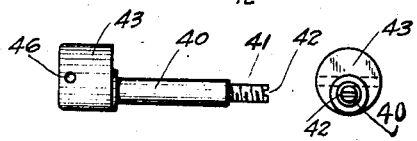
Fig.4.  Fig.5.
Fig.6.
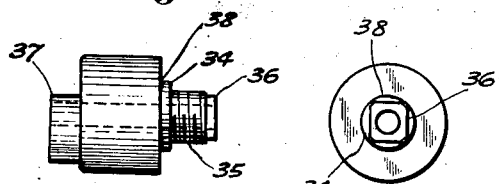
Fig.7.   Fig.8.
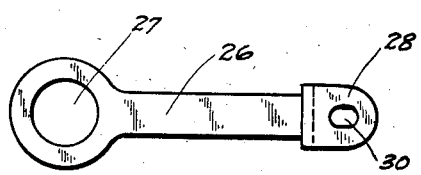
Fig.9.
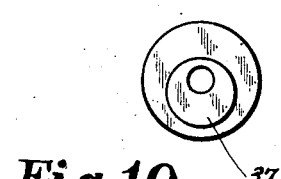
Fig.10.
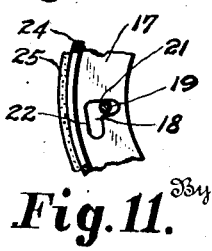
Fig.11.
Inventor
John H. Peterson
By Arthur H. Sturges
Attorney Patented Nov. 7, 1944

2,362,303

UNITED STATES PATENT OFFICE 2,362,303

BRAKE MECHANISM

John H. Peterson, Silver City, Iowa

Application March 29, 1943, Serial No. 480,920

2 Claims. (Cl. 188—78)

This invention relates to brake mechanisms more particularly for automobiles, trucks and the like.

It is an object of the invention to provide a hydraulically actuated braking mechanism so constructed and assembled that an increased and more efficient braking surface is provided.

Another object of the invention is to provide a brake mechanism for the above stated purposes which may be perfectly and easily adjusted for compensating for the wear on the brake lining strip thereof and also complemental to the thickness of linings.

A still further object of the invention is to provide a braking mechanism which is so constructed and assembled that in operation the entire area of the surface of a brake lining is employed for applying a braking force to the brake drum of a vehicle.

An important object of the invention is to provide a brake mechanism so constructed and arranged that the impetus of the travelling movement of a vehicle is utilized for actuating said mechanism for decreasing said impetus during a decrease in the speed of said travelling movement of the vehicle.

Other and further objects and advantages of the invention will be understood from the following detailed description thereof.

In the drawing:

Figure 1 is a side elevation of a brake mechanism, partially in section, embodying the invention, the view being taken substantially on line 1—1 of Figure 2.

Figure 2 is a vertical section thereof taken substantially on line 2—2 of Figure 1.

Figure 3 is a plan view of a brake shoe adjusting mechanism employed, certain portions thereof being broken away and others showing in section.

Figure 4 is a side view of an eccentrically disposed bushing and an integral shaft therefor.

Figures 5 and 6 are, respectively, views of opposite ends of the device shown in Figure 4.

Figure 7 is a side elevation of a shaft-sleeve having an integral second eccentrically disposed bushing thereon.

Figure 8 is an end view of the sleeve-shaft shown in Figure 7.

Figure 9 is a side elevation of a connecting rod employed.

Figure 10 is a view of the other end of the eccentrically disposed bushing shown in Figure 7.

Figure 11 is a side elevation of a fragment of a brake shoe employed and showing an aperture of preferred special shape.

As heretofore practiced in the art, numerous braking mechanisms for automobiles and the like have been employed which include a pair of oppositely disposed brake shoes, the latter having ends which are directly, pivotally secured to a support, the other ends thereof being arranged to move away from each other at times when a force is applied to said other ends and with the result that portions of said shoes adjacent said other ends only engage a brake drum, said pivotally secured ends of said prior constructions not providing braking functions, since said ends do not move against their adjacent brake drum flange, and the present invention aims to obviate the undesirable features of the prior practice by providing a construction which utilizes all of the area of a brake lining surface simultaneously for a comparative increase of the braking force applied to a brake drum.

Referring now to the drawing for a more particular description, 10 indicates generally a brake drum having a plate 11 which is circular in plan and a perimetrically disposed flange 12. The plate 11 is axially and vertically secured to a vehicle wheel in a well known manner, not shown, whereby at times when the wheel revolves the brake drum is provided with correspondingly revoluble movements.

A cover or backing-plate 13 is provided for the drum 10, said plate 13 being secured to and stationary with respect to the rear axle housing of an automobile in a well known manner by conventional means which may include cap screws disposed through the apertures 14 of the plate 13. The plate 13 preferably includes a flange 15 which is snugly disposed about the flange 12 of the brake drum for providing an enclosed housing for preventing debris from entering into the latter. In use, the plate 13 is stationary with respect to the rear axle housing of an automobile and is also stationary with respect to the spindles of the front axle upon which the front wheels are mounted, although said plate is swingable in a horizontal direction when mounted upon said front wheels.

The invention includes oppositely disposed brake shoe segments 16 and 17, each of which is provided with a plurality of spaced apart apertures 18, preferably of special shape, through which the shanks of cap screws 19 extend. The heads of the cap screws are disposed against washers 20, as shown in Figure 1, the latter being disposed against the adjacent surface of the brake shoes in order to span the apertures 18.

Referring to Figure 11, the apertures 18 are each elongated in two directions, said elongations being disposed at substantially a right angle to each other as shown in Figure 11. Each of said apertures 18 has a horizontally disposed elongated wall 21 and an approximately vertically disposed wall 22, and it will be understood that the diameter of the shanks of the cap screws 19 is less with respect to either elongation of the apertures 18, for purposes later described.

The shanks 19 of the cap screws are threadedly secured to the stationary backing-plate 13 and a spacing block 23 is disposed about each shank between the backing-plate 13 and the shoes 16 and 17 for holding the latter a selected distance from said plates of the drum 10. The horizontal walls 21 of the apertures 18 normally rest upon the shanks of the cap screws 19 so that the shoes 16 and 17 are also supported upon the shanks of the cap screws. The shoes are freely slightly slidable in horizontal directions as well as slightly movable in vertical directions and against the urge of later described springs, since as above stated, the diameter of the shanks of the cap screws 19 is less than the width of either of the elongations of each aperture 18.

Each shoe 16 and 17 is provided with an arcuate flange or segmental portion 24 to which strips of conventional brake lining 25 are secured by a suitable means, not shown, such as rivets or the like.

Two connecting rods 26 and 31 are employed for the upper and oppositely disposed spaced apart ends of the segmental shoes 16 and 17. As shown in Figure 9, the connecting rod 26 is provided with an eye 27 at one end, the other end thereof being bifurcated and provided with oppositely disposed ears 28 and 29, the latter being best shown in Figure 3. Aligned elongated apertures 30 are oppositely disposed through the ears 28 and 29. The connecting rod 31 is of like construction, except that it is provided with an offset portion 32 so that the ears of said rods are disposed in alignment with respect to each other for fitting about the inner edges of the shoes 16 and 17. Connecting pivot pins 33 are disposed through and secured to said shoes. Opposite ends of the pins 33 extend through the elongated apertures 30 of the rods for pivotally attaching the rods to said shoes, said attachment being loose to the extent of the elongation of the apertures 30, for the purposes later described.

The eyes 27 of the rods 26 and 31 each fit snugly about and pivotally with respect to eccentrically disposed bushings, the latter being formed integral with their respective shafts, and for compactness of assembly one shaft extends through the other.

Referring to Figure 7, a shaft-sleeve 34 is provided at one end with a threaded portion 35 and an angular end portion 36 for receiving a wrench for purposes later described. The other end of the shaft-sleeve 34 is provided with a bushing 37 which is eccentrically disposed with respect to said shaft-sleeve, said eccentric bushing being disposed through the eye 27 of the connecting rod 26, as shown in Figure 3. The shaft-sleeve 34 is provided with an annular step cut as at 38, said annular step, as best shown in Figures 2 and 3, being disposed against the inner surface of the backing-plate 13 and a nut 39 is provided upon the threaded portion 35 thereof. The nut 39 bears against the exterior surface of the stationary backing-plate 13, as shown in Figure 2. As thus described, it will be noted that an operator may apply a wrench to the angular end portion 38 of the shaft-sleeve at times when the nut 39 is loose for rotating the shaft-sleeve by means of said wrench for the purpose of disposing the eccentric bushing 37 in a selected position and for moving the connecting rod 26, together with the shoe 16 and the brake lining strip 25 thereof, toward or away from the annular flange 12 of the brake drum 10 and to a distance complemental to the thickness of the brake lining strip 25, the upper end of the shoe 16 at said time sliding with respect to the upper cap screw 19, the latter being secured to the stationary backing plate 13.

Referring to Figures 4, 5 and 6, the shaft 40 is provided at one of its ends with a threaded portion 41 and a slot 42 at the outer end thereof for receiving a screw driver bit. The shaft 40 extends through the hollow shaft-sleeve 34 and the inner end of the shaft 40 is provided with an integral eccentrically disposed bushing 43 which is received into the eye 27 of the offset connecting rod 31, as shown in Figure 3.

A washer 44 is disposed upon the outer end of the eccentric 43 and maintained during use by means of a cotter pin or similar suitable keeper 45, said keeper extending through an aperture 46 of the eccentric bushing 43, as shown in Figure 1.

A spring 47 is connected to and between the upper ends of the shoes 16 and 17 for normally urging said shoes toward each other. A nut 48 is disposed upon the threaded portion 41 of the shaft 40, and at times when said nut is not compacted against the angular end portion 36 of the shaft-sleeve 34 an operator may insert a screw driver into the slot 42 of the shaft 40 for rotating the latter for disposing the eccentric bushing 43, together with the offset connecting rod 31, the shoe 17 and its brake lining 25, toward or away from the flange 12 of the brake drum complemental to the thickness of the strip 25 and against the urge of the spring 47 for periodically compensating for wear upon the strip 25 resultant from use.

During an adjustment of the eccentrically disposed bushings, the latter push their respective connecting rods, pins 33, and shoes toward the flange 12 against the urge of the spring 47. The elongated apertures 30 of the connecting rods 26 and 31 are provided for purposes later described.

The lower and oppositely disposed spaced apart ends of the shoes 16 and 17 are connected together by means of a toggle joint. The outer end of the link 49 is pivotally connected to the lower end of the shoe 16, and the outer end of the link 50 is similarly pivotally connected as at 51 to the lower end of the shoe 17. The inner ends of the links 49 and 50 are pivotally connected as at 52 to the lower end of a piston rod 53.

A second spring 54 is attached to and between the lower ends of the shoes 16 and 17 for normally urging said ends toward each other.

The upper end of the piston rod 53 extends into a piston cylinder 55 and is provided with a piston head 56. Within the cylinder and between the upper end thereof and the piston head 56, hydraulic brake fluid is disposed, and the latter also fills a conduit 57.

The conduit 57 extends through the stationary backing-plate 13 adjacent the upper portion thereof, and is in communication with the brake pedal of the vehicle in a well known manner, whereby at times when said pedal is depressed pressure is transferred through said brake fluid contained in the braking system of the vehicle and the conduit 57 and applied to the upper end of the piston head 56 for causing a downward movement of the piston rod 53, thereby causing the outer ends of the links 49 and 50 to spread apart against the urge of the spring 54.

The piston cylinder 55 is provided with oppositely disposed ears 58, the latter being riveted or otherwise suitably secured to the stationary backing-plate 13.

It will be understood that the distance between the brake lining strip 25 and the inner surface of the flange 12 of the brake drum is, in use, comparatively minute, whereby but a slight movement of said shoes away from each other and against said flange is necessary for applying a braking force to the revoluble flange 12.

The shanks of the cap screws being slightly less in diameter than the width, at any point, of either of the elongations of any of the apertures 18, said shanks at times when the shoes are in a normal position, as shown in Figure 1, are then disposed closely adjacent the junction of the walls 21 and 22 of the apertures 18, whereby at the time the shoe 16 moves upwardly, as later described, the elongated walls 22 of the apertures 18 of the shoe 16 slide upon the shanks of the cap screws 19 of the shoe 16 for permitting a slight upward movement of the shoe 16. At times when the shoe 16 is moved outwardly, as later described, the walls 21 of the apertures 18 of the shoe 16 rest upon and slidably engage the shanks of the cap screws 19 of the shoe 16. It will be understood that said sliding movement is appreciably minute and need not be in excess of one sixty-fourth of an inch, and especially at times when the brake lining of the shoe 16 is not unduly worn. It will also be understood that at times when the take-up adjustment mechanism, which includes the eccentric bushings, is employed for compensating for wear of the brake lining 25 of the shoe 16, whereby the outer edge of said brake lining is disposed closely adjacent to the inner wall of the flange 12 of the brake drum, said sliding movement need not be greater than one one-hundredth of an inch, or less.

The walls 21 of the apertures 18 of each of the shoes 16 and 17 are approximately horizontally disposed and carry the weight of the brake shoes thereon at times when said shoes are in a normal position as shown in Figure 1.

In operation, and assuming that the vehicle is travelling forwardly and that the brake drum 11 is applied to either the front or rear wheel of the vehicle and at the left-hand side of the driver or operator, the flange 12 of the brake drum 11 is then revolving in the direction of the arrow 100. To set the brake, the operator depresses the brake pedal of the vehicle and but slight pressure need be applied by his foot upon said pedal, whereupon the outer ends of the toggle links 49 and 50 spread apart and cause a corresponding movement to be applied to the lower ends of the shoes 16 and 17.

The motion of the toggle link 49 caused by a downward movement of the piston rod 53 urges the lower end of the brake shoe 16 toward and against the flange 12, and upon the lower end of the brake lining 25 of the shoe 16 engaging said flange, the revoluble movement of the flange 12, in the direction of the arrow 100, causes the shoe 16 and its lining 25 to become moved upwardly, similarly to a person placing his hand upon a revolving pulley which causes his hand to be moved slightly in the direction the pulley is rotating. The contact of the lower end of the lining 25 of the shoe 16 with the flange 12 causes the shoe 16 to be moved upwardly and in the direction of rotation of the flange 12. Such upward movement is very slight and is permitted on account of the elongation of the apertures 18 of the shoe 16, which include the walls 22 of said apertures.

It will be noted that the upper end of the shoe 16, when forced upwardly as above described, will also swing outwardly and toward the flange 12, since the connecting rod 26 forces the upper end of the shoe outwardly, during an upward movement of the shoe, whereby the entire area of the outer side of the brake lining 25 engages the flange 12.

At the time the brake shoe 16 moves upwardly and in the direction of the arrow 100, the pin 33 of the shoe 16 is then disposed at that end of the aperture 30 which is closest to the eye 27 of the rod 26, said upward and outward movement of the shoe 16 being against the urge of the spring 47, the latter holding the shoe 16 and its lining away from the flange 12 at times when the shoe 16 is in a normal position, as shown in Figure 1.

The flange 12 being revolved in the direction of the arrow 100, then causes a downward movement of the other shoe 17, since the lower end of the lining 25 of the shoe 17 is then engaged with the flange 12, said downward movement being infinitesimally slight, and since the lining 25 of the shoe 17 is then engaged with the flange 12 the upper end of the shoe 17 swings outwardly and slightly downwardly against the urge of the spring 47, said outward movement being permitted since the aperture 30 of the connecting rod 31 is elongated and since the diameter of the shanks of the bolts 19 is slightly less than the width of the horizontally disposed portions of the apertures 18. At this time the shanks of the bolts 19 of the shoe 17 are in approximately the position with respect to the apertures 18 of the shoe 17 as shown in Figure 11. The lining 25 of the shoe 17 being swung outwardly as described, said lining then becomes engaged with the flange 12 as to all portions of the outer surface of said lining for causing both brake shoes to become set practically instantaneously and simultaneously at the time the operator depresses the brake pedal very slightly as compared to the prior practice.

Assuming that the vehicle is travelling rearwardly and that the brake drum 11 is rotating in a direction that is reverse with respect to the arrow 100, that the brake shoes are in the normal position shown in Figure 1, and that a slight pressure is applied to the links of the toggle joint through the piston rod 53, a reverse cycle of events is thereby occasioned; that is, the brake shoe 17 moves upwardly and outwardly and the brake shoe 16 moves slightly downwardly and outwardly for setting the brake shoes against the flange 12, and without a positive locking of the shoes with respect to the flange whereby the so-called "grabbing" of a brake is prevented and a driving factor of safety is provided.

As thus described, it will be noted that but a slight pressure need be applied by the foot of an operator to the brake pedal of a vehicle, since as long as the pressure is sufficient to cause the lower ends of the brake shoes to touch the flange 12, during travel of the vehicle in either direction, the revoluble motion of the flange 12 completes a setting of the brake shoes and without further pressure of the operator's foot, as has been necessary with the hydraulic braking mechanisms of the prior art.

It will also be noted that I provide a brake mechanism having parts so constructed and arranged that the velocity of the vehicle is utilized for decreasing the speed of travelling movement of the vehicle in either direction, and with a very slight pressure on the brake pedal of the vehicle.

At the time the operator's foot is removed from the brake pedal, the spring 54 draws the lower ends of the shoes 16 and 17 toward each other, moving the inner ends of the links 49 and 50 upwardly, together with the piston rod 53, the lower bolts 19 being then in position with respect to the lower apertures 18 of the shoes adjacent the junction of the walls 21 and 22 of said apertures and the upper spring 47 draws the upper ends of the shoes 16 and 17 towards each other, the elongations of the apertures 30 of the connecting rods 26 and 31 permitting the same.

In actual practice the length of the elongations of the apertures 18 is comparatively much less than as shown in the drawing, said elongations being depicted long in Figure 1 to facilitate an illustration and explanation.

As shown in Figures 1 and 3, for convenience of illustration, the eccentric bushings 37 and 43 are disposed in their extreme position of adjustment whereby a further adjustment of the upper ends of the shoes 16 and 17 toward the flange 12 is not possible, and it will be noted that the lower ends of said shoes are self-adjustable with respect to wear on their respective brake lining strips 25.

The eyes 27 of the rods 26 and 31 are pivotally mounted on their respective eccentrically disposed bushings. However, said bushing pivotal connection of said eyes and rods is also eccentrically disposed with respect to the axis of the rotatable annular flange 12 as is essential, said bushings each being disposed approximately two-thirds of the distance of the flange 12 from the latter's axis, said rods being of sufficient length to cause that end of the shoe 16 to be forced outward to which the rod 26 is attached at the time the lower end of the shoe 16 engages the flange 12 when the latter is moving in the direction of the arrow 100. The other rod 31 is also of sufficient length in conjunction with the elongation of its aperture 30 to permit the end of the shoe 17 to which it is attached to swing or slide downwardly against the flange 12 at the time the lower end of the shoe 17 engages the flange 12 while the latter is revolving in the direction of the arrow 100, whereby the juxtaposed shoes 16 and 17 both apply a braking force simultaneously to the flange 12, said shoes sliding or swinging slightly, for said purpose, the substantially L-shaped apertures 18 permitting said sliding or swinging at the time the hydraulically actuated pressure means is applied to the toggle-links by the operator's foot and brake pedal of the vehicle.

Said apertures 18 also permit the means which is responsive to engagement of the lower juxtaposed ends of the brake shoes with the revolving flange 12 to operate for causing the upper juxtaposed ends of the brake shoes to also engage the flange 12, together with permitting the resilient means or springs 54 and 47 to draw said ends of the shoes away from the flange when said pressure is removed from the toggle links 49 and 50.

From the foregoing description it is thought to be obvious that a brake mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

I claim:

1. In a braking mechanism, a revoluble brake-drum having an annular flange, a stationary backing-plate for said drum, the normal operating positions of said plate and flange being vertical and horizontal respectively, a pair of brake-shoes juxtaposed within the plane of said flange, each shoe being provided with a plurality of spaced apart apertures of substantially L-shape in plan, one of the arms of each aperture being disposed substantially vertically and the other arm of each aperture being substantially horizontally disposed, bolt shanks of lesser diameter than the width of the arms of said apertures disposed through the latter, ends of said shanks being secured to said plate at one side of said shoes, heads of said bolts being disposed at the other side of said shoes for loosely holding said shoes slidably adjacent the inner surface of said plate, and springs connected to and between the juxtaposed ends of both of said shoes for urging the latter toward each other.

2. A braking mechanism for a vehicle wheel or the like having a brake-drum provided with an annular flange, a backing plate for said drum secured to a stationary portion of said vehicle, a pair of brake shoes juxtaposed with the plane of said flange, each of said shoes being provided with a plurality of spaced apart apertures having vertical and horizontal arms, fastening means having shanks of lesser diameter than the width of the arms of said apertures disposed through the latter, said shoes being loosely carried by said plate to dispose their outer surfaces respectively adjacent to the inner annular surface of said flange, means for causing the juxtaposed ends of said shoes to engage said flange, and means responsive to a rotation of said flange for causing the other ends of said shoes to engage said flange to cause a braking force to be applied to said drum.

JOHN H. PETERSON.